(12) United States Patent
Iyer et al.

(10) Patent No.: US 11,410,316 B1
(45) Date of Patent: Aug. 9, 2022

(54) SYSTEM AND COMPUTER-IMPLEMENTED METHOD FOR VALIDATION OF LABEL DATA

(71) Applicant: UiPath, Inc., New York, NY (US)

(72) Inventors: Kartik Iyer, Karnataka (IN); Mark Benyovszky, La Quinta, CA (US); Eshwar Ganesan, Bangalore (IN)

(73) Assignee: UiPath, Inc., New York, NY (US)

( * ) Notice: Subject to any disclaimer, the term of this patent is extended or adjusted under 35 U.S.C. 154(b) by 17 days.

(21) Appl. No.: 17/197,527

(22) Filed: Mar. 10, 2021

(30) Foreign Application Priority Data

Jan. 27, 2021 (IN) .............................. 202111003686

(51) Int. Cl.
*G06T 7/11* (2017.01)
*G06F 40/295* (2020.01)
*G06K 9/62* (2022.01)
*G06T 7/181* (2017.01)

(52) U.S. Cl.
CPC .............. *G06T 7/11* (2017.01); *G06F 40/295* (2020.01); *G06K 9/6262* (2013.01); *G06T 7/181* (2017.01); *G06T 2207/20081* (2013.01); *G06T 2207/20092* (2013.01); *G06V 2201/07* (2022.01)

(58) Field of Classification Search
CPC . G06T 7/11; G06T 7/181; G06T 2207/20081; G06T 2207/20092; G06F 40/295; G06K 9/6262; G06V 2201/07
See application file for complete search history.

(56) References Cited

U.S. PATENT DOCUMENTS

| | | |
|---|---|---|
| 2018/0285773 A1 | 10/2018 | Hsiao et al. |
| 2019/0251392 A1 | 8/2019 | Brown et al. |
| 2019/0279362 A1* | 9/2019 | Marrero Callicó .. G06K 9/6223 |
| 2019/0311478 A1* | 10/2019 | Avendi ...................... G06T 7/75 |
| 2019/0378267 A1 | 12/2019 | Giering et al. |
| 2020/0160979 A1* | 5/2020 | Lyman ............. G06Q 10/06315 |
| 2020/0401851 A1 | 12/2020 | Mau et al. |
| 2021/0019574 A1 | 1/2021 | Voicu |
| 2021/0133438 A1* | 5/2021 | Florencio .............. G06F 3/0484 |

OTHER PUBLICATIONS

International Search Report & Written Opinion, dated Feb. 18, 2022, PCT Application No. PCT/US21/56945.

* cited by examiner

*Primary Examiner* — Bobbak Safaipour
(74) *Attorney, Agent, or Firm* — LeonardPatel PC; Sheetal S. Patel; Michael A. Leonard, II

(57) ABSTRACT

A system and a computer-implemented method for validating label data includes receiving the label data and segmenting it into one or more parts using a first machine learning model. Further, from the segmented label data a first plurality of attributes, including text and images, are extracted. The method further includes receiving ground truth data associated with the label data and extracting a second plurality of attributes from the ground truth data. The first and second plurality of attributes are then compared using a second machine learning model and the result of comparison are displayed on a three pane user interface. Further, the label data is validated based on the displayed results.

20 Claims, 10 Drawing Sheets

Artwork - Validation

Ui Path™

Mistakes

| 5 Mistakes | 2 general advisory | 1 ocr advisory | ▽ | Save |

Ingredients

| LID | Artwork | Comments |
|---|---|---|
| * | HIGH FRUCTOSECORN SYRUP | HIGH FRUCTOSECORN SYP FAO CICACID |  |
| * | NATURAL FLAVOR |  |  |
| * | CITRIC ACID |  |  |
| * | GLM ARABIC |  |  |
| * | SODIUM CITRATE | SODIUM CITRATEGUN PACIFIC |  |

Nutritiontable

| LID | Artwork | Comments |
|---|---|---|
| * | Incl. Added Sugars 46g 91% 129g 257% Not a significant source of other nutrients. * The * Daily Value (DV) tells you how much a nutrient in a serving food contributes to a daily diet. 2,000 calories a day is used for general nutrition advice. | Includes Added Sugars 46g 91% 129g 257% Not a significant source of other nutrients. * The * Daily Value (DV) tells you how much a nutrient in a serving food contributes to a daily diet. 2,000 calories a day is used for general nutrition advice. CAFFEINE CONTENT : 55mg/12 fl oz; 154mg/1L. We're here to |  |
| * | Total Fat 0g 0%0g 0% | Total Fat 0g 0% 0g 0% |  |

FIG. 6A

Artwork - Validation

Ui Path™    Save

Mistakes ▽

| 5 Mistakes | 2 general advisory | 1 ocr advisory | ← 610c |

Ingredients — 600c

| LID | Artwork | Comments | ← 620c |
|---|---|---|
| * HIGH FRUCTOSECORN SYRUP | HIGH FRUCTOSECORN SYP FAO CIC ACID | |
| * NATURAL FLAVOR | | |
| * CITRIC ACID | | |
| * GLM ARABIC | | |
| * SODIUM CITRATE | SODIUM CITRATEGUN PACIFIC | |

Nutritiontable

| LID | Artwork | Comments | ← 630c |
|---|---|---|
| * Incl. Added Sugars 46g 91% 129g 257%. Not a significant source of other nutrients. * The * Daily Value (DV) tells you how much a nutrient in a serving food contributes to a daily diet. 2,000 calories a day is used for general nutrition advice. | Includes Added Sugars 46g 91% 129g 257%. Not a significant source of other nutrients. * The * Daily Value (DV) tells you how much a nutrient in a serving food contributes to a daily diet. 2,000 calories a day is used for general nutrition advice. CAFFEINE CONTENT: 55mg/12 fl oz; 154mg/1L. We're here to | |
| * Total Fat 0g 0% 0g 0% | Total Fat 0g 0% 0g 0% | |

FIG. 6C

SYSTEM AND COMPUTER-IMPLEMENTED METHOD FOR VALIDATION OF LABEL DATA

CROSS-REFERENCE TO RELATED APPLICATION

This application claims the benefit of, and priority to, Indian Patent Application No. 202111003686, filed on Jan. 27, 2021. The subject matter thereof is hereby incorporated herein by reference in its entirety.

FIELD

The present invention generally relates to robotic process automation (RPA), and more specifically, to validation of artwork labels using RPA.

BACKGROUND

RPA has been used to facilitate the proliferation of software automation due to its execution of relatively simple, repeatable tasks that exist in large numbers within an enterprise. RPA generally allows automation of simple tasks that were earlier done using manual user input to a computing system and are now being increasingly performed by software robots using RPA tools. Currently, RPA tools are available which may help a software developer to design, execute, deploy, and test the simple tasks and repeated tasks of the enterprise. For example, these tasks may be designed using designer tools and deployed using deployment tools. Some of the tasks may related to specific product based application areas. One such application area is design and validation of labels. The labels may include artwork labels, such as product labels, labels for artistic pieces like paintings, marketing pamphlets and brochures and the like. Generally, these artwork labels include a combination of text and images. Sometimes the artwork labels are used for mass printing, such as in case of product labels. In these cases, it is crucial to have the label validated accurately and efficiently before printing. Even a minor mistake in validation of the label may lead to huge loss of resources and increased cost of production if an erroneous label gets mass produced.

Some of the errors in validation of artwork labels are caused to human error, such as if a human quality control personnel is not able to identify minute error at the time of human validation. To that end, automated tools for design and validation of artwork labels are required for efficient and accurate validation of labels.

SUMMARY

Certain embodiments of the present invention provide better and easy solutions to the problems and needs in the art that have not yet been fully identified, appreciated, or solved by current RPA technologies. For example, some embodiments of the present invention pertain to machine learning (ML) based validation of label data, such as for artwork labels, for providing efficient, accurate and economical procedures for validation of artwork labels. Some embodiments provide an intuitive and easy to navigate user interface including at least three display panes for performing the validation of label data. The at least three display panes (or 3-panes) include at least a first display pane configured for displaying one or more mistakes in the label data, a second display pane configured for displaying the label data and a third display pane configured for displaying ground truth data associated with the label data.

In an embodiment, a computer-implemented method is provided. The computer-implemented method employs at least one hardware processor for executing a series of operations, wherein the series of operations are used for validation of label data. The series of operations include receiving the label data and segmenting the received label data into one or more parts using a first ML model. The output is thus segmented label data. The series of operations further include extracting a first plurality of attributes from the segmented label data. The series of operations further include receiving ground truth data associated with the label data and extracting a second plurality of attributes from the ground truth data. The series of operations further include comparing, using a second ML model, the first plurality of attributes from the segmented label data with the second plurality of attributes from the ground truth data and displaying the result of comparison on a user interface including at least three display panes. The series of operations additionally include validating the label data based on the displayed results of comparison.

In yet another embodiment a system is provided. The system includes a memory configured to store computer-executable instructions and one or more processors configured to execute the instructions. The computer-executable instructions are configured to cause the one or more processors to validate label data. The computer-executable instructions are further configured to cause the one or more processors to receive the label data and segment the received label data into one or more parts using a first learning model, and thus provide segmented label data. The computer-executable instructions are further configured to cause the one or more processors to extract a first plurality of attributes from the segmented label data. The computer-executable instructions are further configured to cause the one or more processors to receive ground truth data and extract a second plurality of attributes from the received ground truth data. The computer-executable instructions are further configured to cause the one or more processors to compare, using a second ML model, the first plurality of attributes from the segmented label data with the second plurality of attributes from the ground truth data. The computer-executable instructions are further configured to cause the one or more processors to display the result of comparison on a user interface including at least three display panes. Additionally, the computer-executable instructions are configured to cause the one or more processors to validate the label data based on the displayed result of comparison.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 6A-6C are GUIs illustrating user interfaces for validation of labels, according to an embodiment of the present invention.

DETAILED DESCRIPTION OF THE EMBODIMENTS

Figure 1:
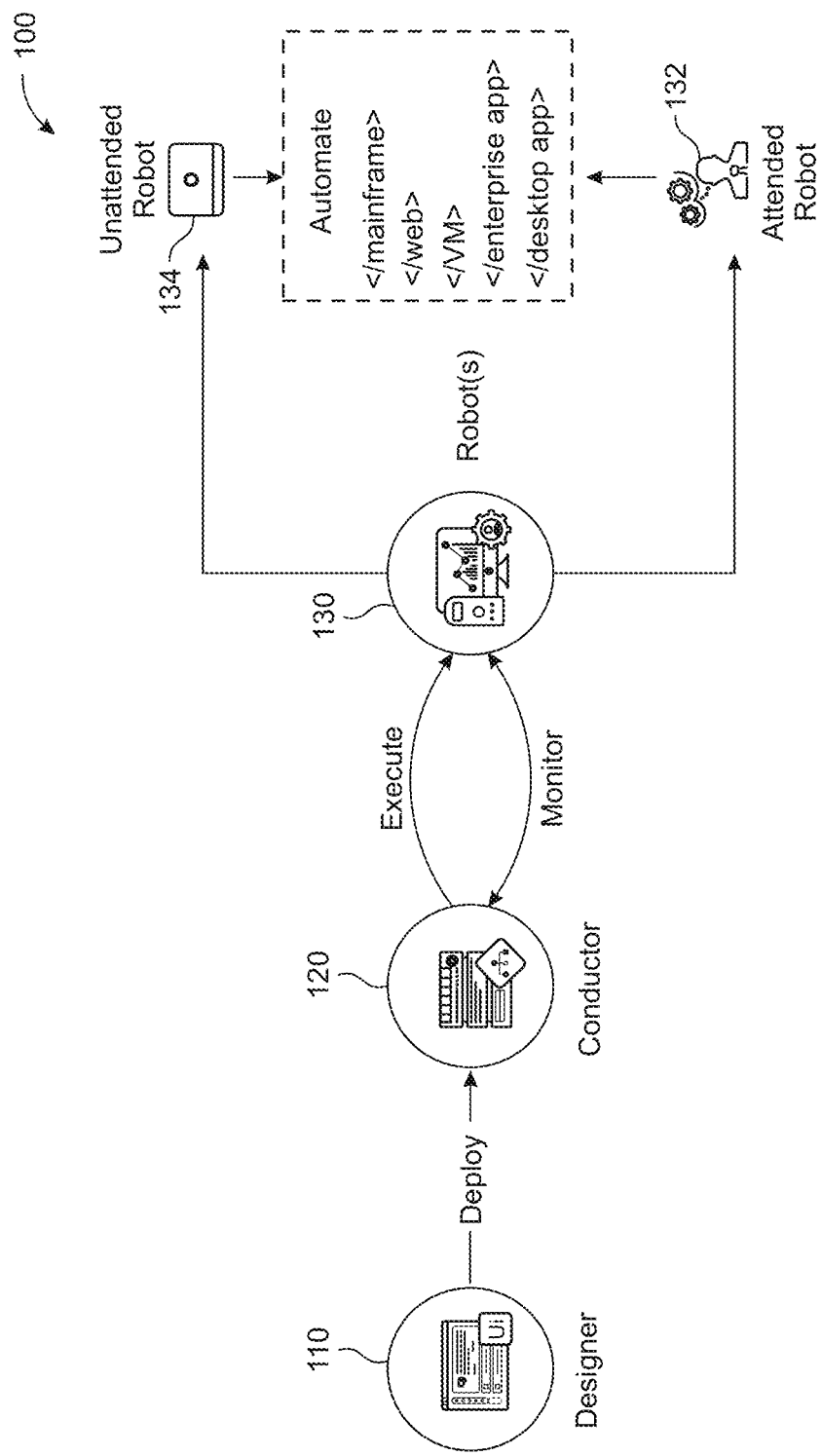
FIG. 1 is an architectural diagram illustrating an RPA system, according to an embodiment of the present invention.

Some embodiments pertain to a system (hereinafter referred to as a "computing system") configured to provide functionalities to view, compare and to validate labels, such as artwork labels, product labels and the like. In order to validate the labels, data or information contained in the labels, such as newly designed labels, are compared (or validated) with ground truth data associated with such labels. The ground truth data includes previously available information about the labels, such as in the form of previous labels, label templates, label design documents provided by a product manufacturing or marketing company to a product design company. The ground truth data may be used as a basis for validating the label data using the system disclosed herein. For instance, the system is configured to provide a user interface (UI) includes at least three display panes, so that it is easy, intuitive, efficient and time saving to compare the label data, such as for a newly designed label, with ground truth data, such as a previously designed label.

In some prior solutions to the problem of comparing the label data with ground truth data, the user was required to switch between multiple display applications continuously and manually, such as in the form of display tabs and compare each aspect manually, between the label data and the ground truth data, which is a time-consuming task. This is also a repetitive process, which is prone to human error due to lack of focus, less attention to detail and being monotonously manual. To decrease the burden of comparing the labels with ground truth documents, some embodiments provide a UI with three display panes within a single UI display area. This way, the user can notice the changes between the label data and the ground truth data easily and highlight the areas where the mistakes occurred in the label data.

In addition, some embodiments incorporate the use of computationally efficient technologies like ML and robotic process automation (RPA) to provide high degree of computational efficiency, by providing improved execution time and reduced storage requirements and at the same time, less complexity at user device level. This is because the "system" may be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the embodiments in any way but is intended to provide one example of the many embodiments. Indeed, some embodiments may be implemented in localized and distributed forms consistent with computing technology, including cloud computing systems. These and other architectural configurations are discussed in the following description, without limiting the scope of the embodiments of the present invention.

FIG. 1 is an architectural diagram illustrating an RPA system 100, according to an embodiment of the present invention. RPA system 100 includes a designer 110 that allows a developer or a user to design and implement workflows. Designer 110 provides a solution for application integration, as well as automating third-party applications, administrative Information Technology (IT) tasks, and business IT processes. Designer 110 further facilitates development of an automation project, which is a graphical representation of a business process. Simply put, designer 110 facilitates the development and deployment of workflows and robots. Some workflows relate to an automation project of label data validation pipeline, such as for validation of artwork label images, which is referred to as label data. The automation involves identification of label data and ground truth data (such as previous artwork label images or template label images provided in a document), such as by using a combination of computer vision (CV) and Optical Character Recognition (OCR) technologies, extraction of a plurality of text and image based attributes from the label data and the ground truth data, performing bounding boxes on the label data and the ground truth data using ML algorithms, comparing similar attributes in the bounding boxes in label data and ground truth data using ML, displaying the comparison results on the UI including three display panes for simultaneous viewing of differences, mistakes and editing options for label data, performing a suitable corrective activity on the label data based on displayed comparison results and validating the label by confirming the corrective activity and/or rejecting any errors and mismatches between the label data and the ground truth data. As part of RPA, shapes such as squares, rectangles, circles, polygons, freeform, or the like in multiple dimensions may be utilized for UI robot development and runtime in relation to a computer vision (CV) operation or ML model by the automation project for label data validation.

The automation project enables automation of rule-based processes by giving the developer control of the execution order and the relationship between a custom set of steps developed in a workflow, defined herein as "activities." One commercial example of an embodiment of designer 110 is UiPath Studio™ Each activity includes an action, such as clicking a button, reading a file, writing to a log panel, etc. In some embodiments, workflows can be nested or embedded.

Some types of workflows include, but are not limited to, sequences, flowcharts, Finite State Machines (FSMs), and/or global exception handlers. Sequences are particularly suitable for linear processes, enabling flow from one activity to another without cluttering a workflow. Flowcharts are particularly suitable to more complex business logic, enabling integration of decisions and connection of activities in a more diverse manner through multiple branching logic operators. FSMs are particularly suitable for large workflows. FSMs use a finite number of states in their execution, which can be triggered by a condition (i.e., transition) or an activity. Global exception handlers are particularly suitable for determining workflow behavior when encountering an execution error and for debugging processes.

Once a workflow is developed in designer 110, execution of business processes is orchestrated by a conductor 120, which orchestrates one or more robots 130 that execute the workflows developed in designer 110. One commercial example of an embodiment of conductor 120 is UiPath Orchestrator™ Conductor 120 facilitates management of the creation, monitoring, and deployment of resources in an environment. Conductor 120 acts as an integration point with third-party solutions and applications. In an embodiment, conductor 120 is integrated with a web based user interface.

Conductor 120 manages a fleet of robots 130, connecting and executing robots 130 from a centralized point. Types of robots 130 that are managed include, but are not limited to, attended robots 132, unattended robots 134, development robots (similar to the unattended robots 134, but used for development and testing purposes), and nonproduction robots (similar to the attended robots 132, but used for development and testing purposes). Attended robots 132 are triggered by user events and operate alongside a human on the same computing system. Attended robots 132 are used with conductor 120 for a centralized process deployment and logging medium. Attended robots 132 help a human user accomplish various tasks, and are triggered by the user events. In some embodiments, processes are not started from conductor 120 on this type of robot and/or they do not run under a locked screen. In certain embodiments, attended robots 132 are started from a robot tray or from a command prompt. Attended robots 132 run under human supervision in some embodiments. For example, some attended robots 132 may be used for supervised ML methodologies requiring human intervention for training data generation for a first ML model configured for classifying an image based on the training dataset of images. The training dataset may be generated by assigning labels or tags to an image, for the purpose of identifying a category or a class associated with the image. For example, the image may be related to a product label for a soft drink, then the category that the image belongs to may be "beverages" and thus, in the training dataset, the image may be associated with the corresponding "beverages" tag. Like this, thousands of images may be tagged to form the training dataset for the corresponding first ML model. Attended robots 132 facilitate in generation of training dataset by providing supervised categorization of training data images.

In some embodiments, attended robots 132 are configured to classify a plurality of segments within the label data, such as a nutrition facts table, an ingredients, thumbnail and the like if the label data is related to "beverages" industry. The classified segments are further provided with one or more bounding boxes defined in the form of coordinates data:(x1 y1, x2 y2, x3 y3, x4 y4) for each of the identified segments of the label data.

In some embodiments, the attended robots 132 are also configured to use the ML model (which may be same of different from the previously disclosed ML model) to first generate one of more super categories for the images in the training dataset, for example, a chips packet or a snack, a beverage, a water bottle, and the like. Then, the ML model first uses a first classifier algorithm to correctly classify the artwork label into a super category (beverage, snacks, and the like), and then uses a second level of classification to identify the one or more segments in the label data as mentioned previously.

Unattended robots 134 run unattended in virtual environments and automate many processes. Unattended robots 134 are responsible for remote execution, monitoring, scheduling, and providing support for work queues. Debugging for all robot types is run in designer 110 in some embodiments. Both attended robots 132 and unattended robots 134 automate various systems and applications including, but not limited to, mainframes, web applications, Virtual machines (VMs), enterprise applications (e.g., those produced by SAP®, SalesForce®, Oracle® etc.), and computing system applications (e.g., desktop and laptop applications, mobile device applications, wearable computer applications, image classification applications etc.). For example, once a training dataset has been generated using supervised or attended robots 132, unattended robots 134 may be used for retraining of ML models (like the first ML model for image classification), based on outcomes of computing applications. If a label is validated using the computing system disclosed herein, unattended robots 134 are used to take the output result of validation, which is whether the label is valid/invalid and what are the mismatches and feed these results back to the first machine model (or other similar models disclosed herein) for self-learning. Robots 130, whether attended 132 or unattended 134, are provisioned and maintained by conductor 120.

Conductor 120 has various capabilities including, but not limited to, provisioning, deployment, configuration, queueing, monitoring, logging, and/or providing interconnectivity. Provisioning includes creating and maintenance of connections between robots 130 and conductor 120 (e.g., a web application). Deployment includes assuring the correct delivery of package versions to the assigned robots 130 for execution. Configuration includes maintenance and delivery of robot environments and process configurations. Queueing includes providing management of queues and queue items. Monitoring includes keeping track of robot identification data and maintaining user permissions. Logging includes storing and indexing logs to a database (e.g., an SQL database) and/or another storage mechanism (e.g., ElasticSearch® which provides an ability to store and quickly query large datasets). Conductor 120 provides interconnectivity by acting as the centralized point of communication for the third-party solutions and/or applications.

Robots 130 can be execution agents that run workflows built in designer 110. One commercial example of some embodiments of the robot(s) 130 is UiPath Robots™. In some embodiments, robots 130 install the Microsoft Windows® Service Control Manager (SCM)-managed service by default. As a result, robots 130 can open interactive Windows® sessions under the local system account and have rights of a Windows® service.

In some embodiments, robots 130 are installed in a user mode. For such robots 130, this means they have the same rights as the user under which a given robot 130 has been installed. This feature is also available for High Density (HD) robots, which ensure full utilization of each machine at its maximum potential. In some embodiments, any type of robots 130 can be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between the conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. The user mode robot services can be trusted with and manage the credentials for robots 130. A Windows® application is automatically be launched if the SCM-managed robot service is not installed.

Executors run given jobs under a Windows® session (i.e., they may execute workflows). The executors are aware of per-monitor dots per inch (DPI) settings. Agents could be Windows® Presentation Foundation (WPF) applications that display the available jobs in the system tray window. The agents could be a client of the service. The agents request to start or stop jobs and change settings. The command line is a client of the service. The command line is a console application that requests to start jobs and waits for their output.

Having components of robots 130 split as explained above helps developers, support users, and computing systems more easily run, identify, and track what each component is executing. Special behaviors can be configured per component this way, such as setting up different firewall rules for the executor and the service. The executor is always aware of the DPI settings per monitor in some embodiments. As a result, the workflows can be executed at any DPI, regardless of the configuration of the computing system on which they were created. Projects from designer 110 can also be independent of a browser zoom level in some embodiments. For applications that are DPI-unaware or intentionally marked as unaware, DPI is disabled in some embodiments.

Figure 2:
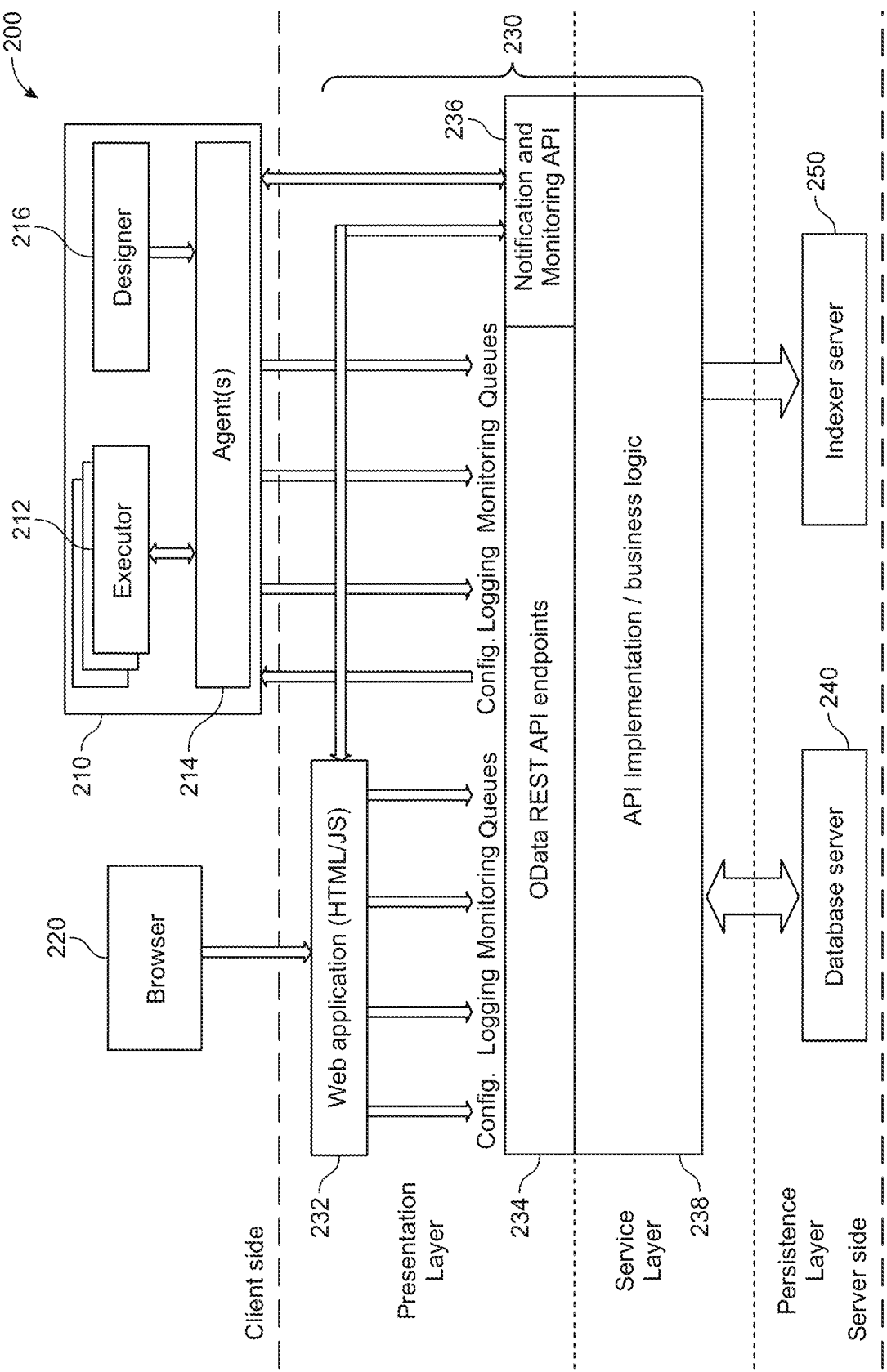
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may not be a part of, RPA system 100 of FIG. 1. It should be noted that a client side, a server side, or both, may include any desired number of the computing systems without deviating from the scope of the invention. On the client side, a robot application 210 includes executors 212, an agent 214, and a designer 216 (for instance, the designer 110). However, in some embodiments, designer 216 is not running on robot application 210. Executors 212 are running processes. Several business projects (i.e. executors 212) run simultaneously, as shown in FIG. 2. Agent 214 (e.g., the Windows® service) is the single point of contact for all executors 212 in this embodiment. All messages in this embodiment are logged into a conductor 230, which processes them further via a database server 240, an indexer server 250, or both. As discussed above with respect to FIG. 1, executors 212 are robot components.

In some embodiments, a robot represents an association between a machine name and a username. The robot manages multiple executors at the same time. On computing systems that support multiple interactive sessions running simultaneously (e.g., Windows® Server 2012), there multiple robots are running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 opens a WebSocket channel that is later used by conductor 230 to send commands to the robot (e.g., start, stop, etc.).

On the server side, a presentation layer (a web application 232, an Open Data Protocol (OData) Representative State Transfer (REST) Application Programming Interface (API) endpoints 234, and a notification and monitoring API 236), a service layer (an API implementation/business logic 238), and a persistence layer (the database server 240 and the indexer server 250) are included. Conductor 230 may include web application 232, the OData REST API endpoints 234, the notification and monitoring API 236, and the API implementation/business logic 238. In some embodiments, most actions that a user performs in an interface of conductor 230 (e.g., via a browser 220) are performed by calling various APIs. Such actions include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user creates robot groups, assign packages to the robots, analyze logs per robot and/or per process, start and stop robots, etc.

In addition to web application 232, conductor 230 also includes service layer that exposes the OData REST API endpoints 234. However, other endpoints may be included without deviating from the scope of the invention. The REST API is consumed by both web application 232 and agent 214. The agent 214 is the supervisor of the one or more robots on the client computer in this embodiment.

The REST API in this embodiment covers configuration, logging, monitoring, and queueing functionality. The configuration endpoints are used to define and configure application users, permissions, robots, assets, releases, and environments in some embodiments. Logging REST endpoints are used to log different information, such as errors, explicit messages sent by the robots, and other environment-specific information, for instance. Deployment REST endpoints are used by the robots to query the package version that should be executed if the start job command is used in conductor 230. Queueing REST endpoints are responsible for queues and queue item management, such as adding data to a queue, obtaining a transaction from the queue, setting the status of a transaction, etc.

Monitoring REST endpoints monitor web application 232 and agent 214. The notification and monitoring API 236 could be REST endpoints that are used for registering agent 214, delivering configuration settings to agent 214, and for sending/receiving notifications from the server and agent 214. The notification and monitoring API 236 also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 manages queues and queue items. In some embodiments, database server 240 stores messages logged by the robots (in addition to or in lieu of indexer server 250).

Indexer server 250, which is optional in some embodiments, stores and indexes the information logged by the robots. In certain embodiments, indexer server 250 could be disabled through the configuration settings. In some embodiments, indexer server 250 uses ElasticSearch®, which is an open source project full-text search engine. The messages logged by robots (e.g., using activities like log message or write line) are sent through the logging REST endpoint(s) to indexer server 250, where they are indexed for future utilization.

Figure 3:
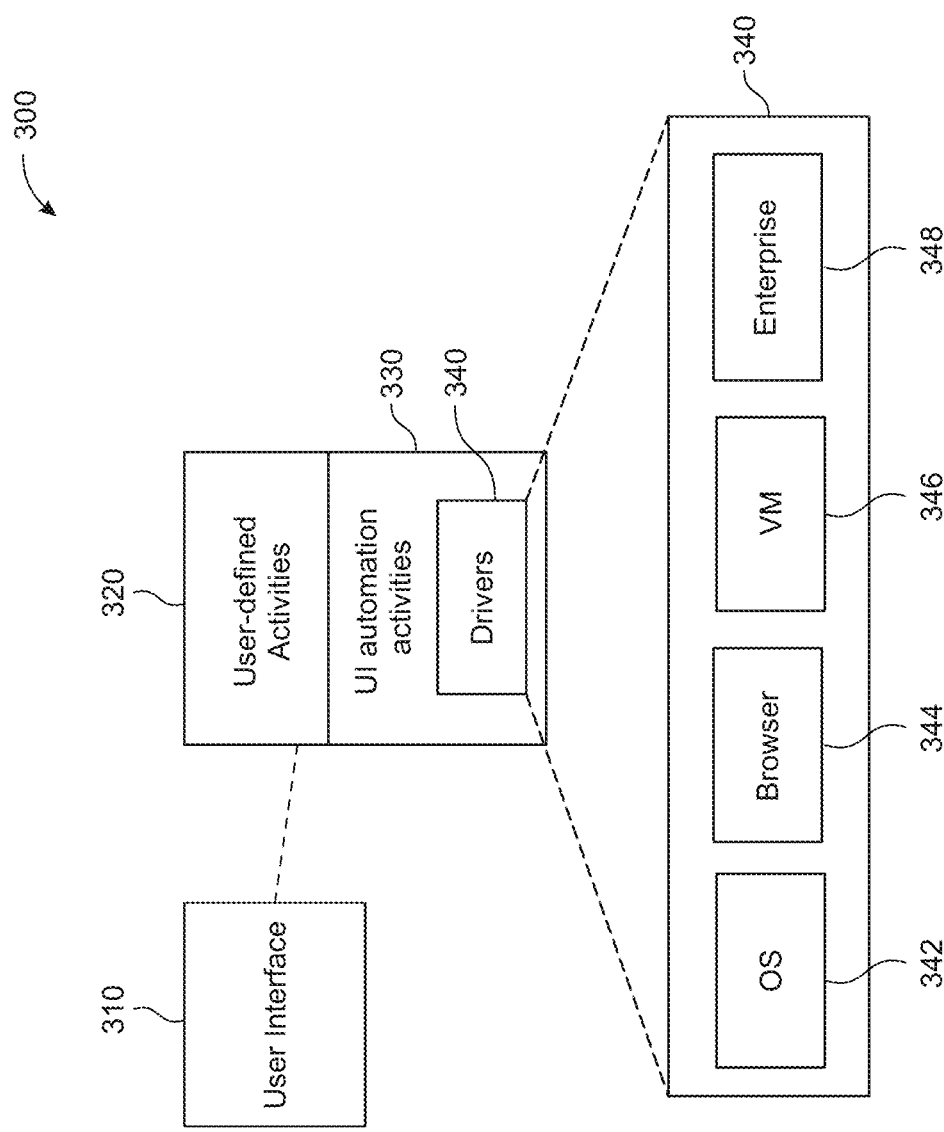
FIG. 3 is an architectural diagram illustrating the relationship between a designer, activities, and drivers, according to an embodiment of the present invention.
Figure 6A:
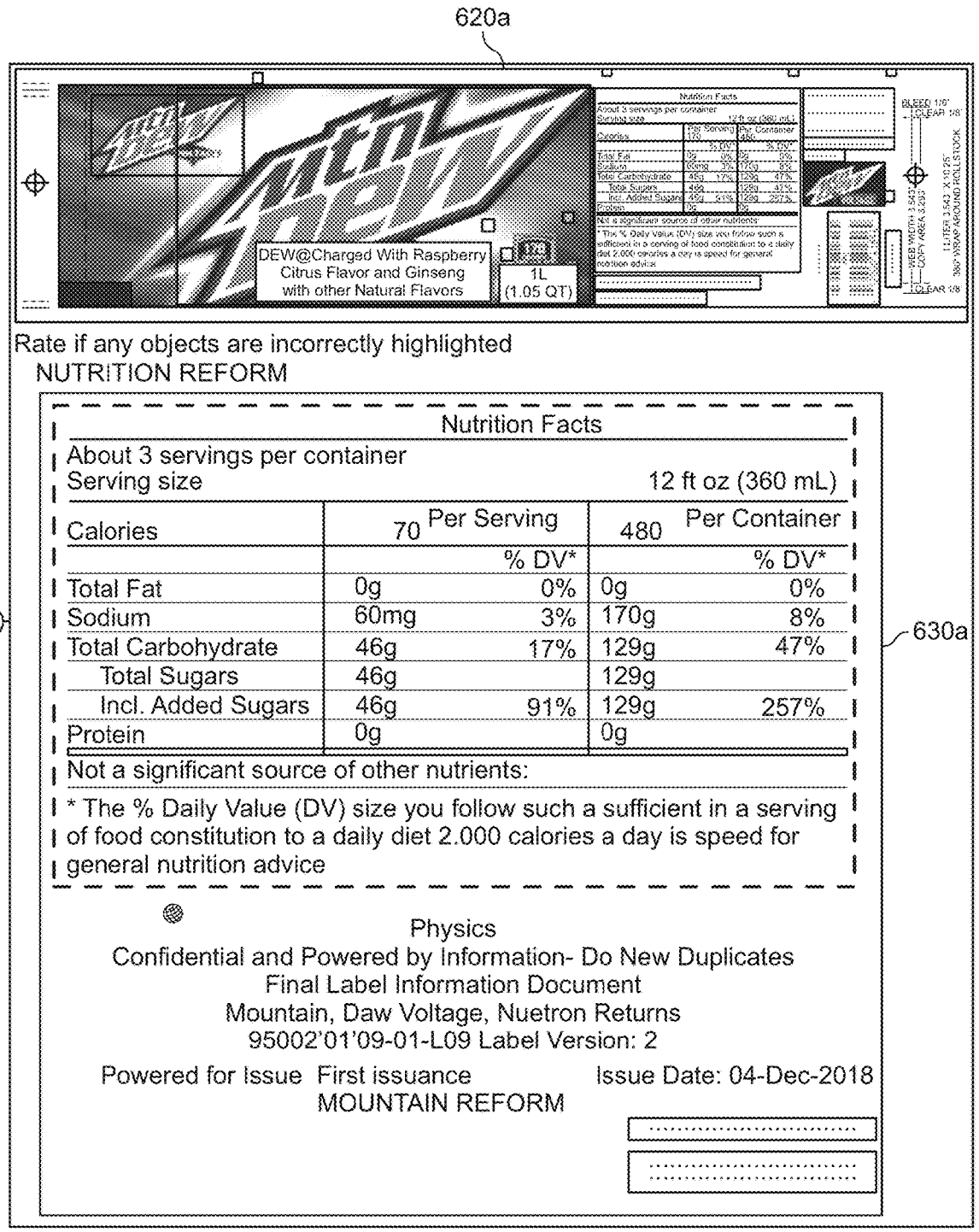

FIG. 3 is an architectural diagram illustrating a relationship 300 between a user interface 310, user-defined activities 320, User Interface (UI) automation activities 330, and drivers 340, according to an embodiment of the present invention. Per the above, user interface 310 includes at least three display panes: a first display pane configured for displaying one or more mistakes in a received label data that is compared to the ground truth data for labels, a second display pane configured for displaying the label data itself, and a third display pane configured for displaying the ground truth data. A user interface embodied in this manner is illustrated in FIG. 6A and will be described in detail with the description of FIG. 6A.

In some alternate embodiments, user interface 310 is a part of a design module of an integrated development environment (IDE), which allows the user or a designer of artwork labels to perform one or more functionalities related to the workflows for label data validation. The functionalities include comparing label data with ground truth data, annotating labels, accepting changes, editing, saving, modifying and the like for the workflows. Further, in some embodiments, user interface 310 is configured to provide options to the user for receiving a user input for performing a corrective activity for the one or more mistakes in the label data, updating the label data based on the received user input, displaying corrected label data based on the update, accepting the corrected label data by providing acceptance confirmation response on the first display pane for the corrected label, rejecting the corrected label by providing rejection confirmation response on the first display pane and the like.

In some embodiments, the workflows include user-defined activities 320 and UI automation activities 330. Some embodiments are able to identify non-textual visual components in an image associated with the workflows, such as the label data, which is an image of the artwork label, using computer vision (CV) activities. Some CV activities pertaining to such components may include, but are not limited to, extracting of text from segmented label data using optical character recognition (OCR), fuzzy text matching, cropping of segmented label data using ML, comparison of extracted text in label data with ground truth data and the like. In some embodiments, there may be hundreds or even thousands of activities that may be implemented in user defined activities 320 component. However, any number and/or type of activities may be available without deviating from the scope of the invention.

UI automation activities 330 are a subset of special, lower level activities that are written in lower level code (e.g., CV activities) and facilitate interactions with the screen. In some embodiments, UI automation activities 330 include activities, which are related to label identification, label validation, ground truth data collection, ground truth data classification, label data classification, label data segmentation, data extraction related to a plurality of attributes from label data and ground truth data, bounding box generation, label data comparison with ground truth data, label data highlighting, annotating, coloring and the like. UI automation activities 330 facilitate these interactions via drivers 340 that allow the robot to interact with the desired software. For instance, drivers 340 include Operating System (OS) drivers 342, browser drivers 344, VM drivers 346, enterprise application drivers 348, etc.

Drivers 340 are configured to interact with OS drivers 342 at a low level looking for hooks, monitoring for keys, etc. They may facilitate integration with Chrome®, IE®, Citrix®, SAP®, etc. For instance, the "click" activity performs the same role in these different applications via drivers 340. Drivers 340 may enable execution of an RPA application in an RPA system. Browser drivers 344 include a web-based user interface for a user or developer to interact.

Figure 4:
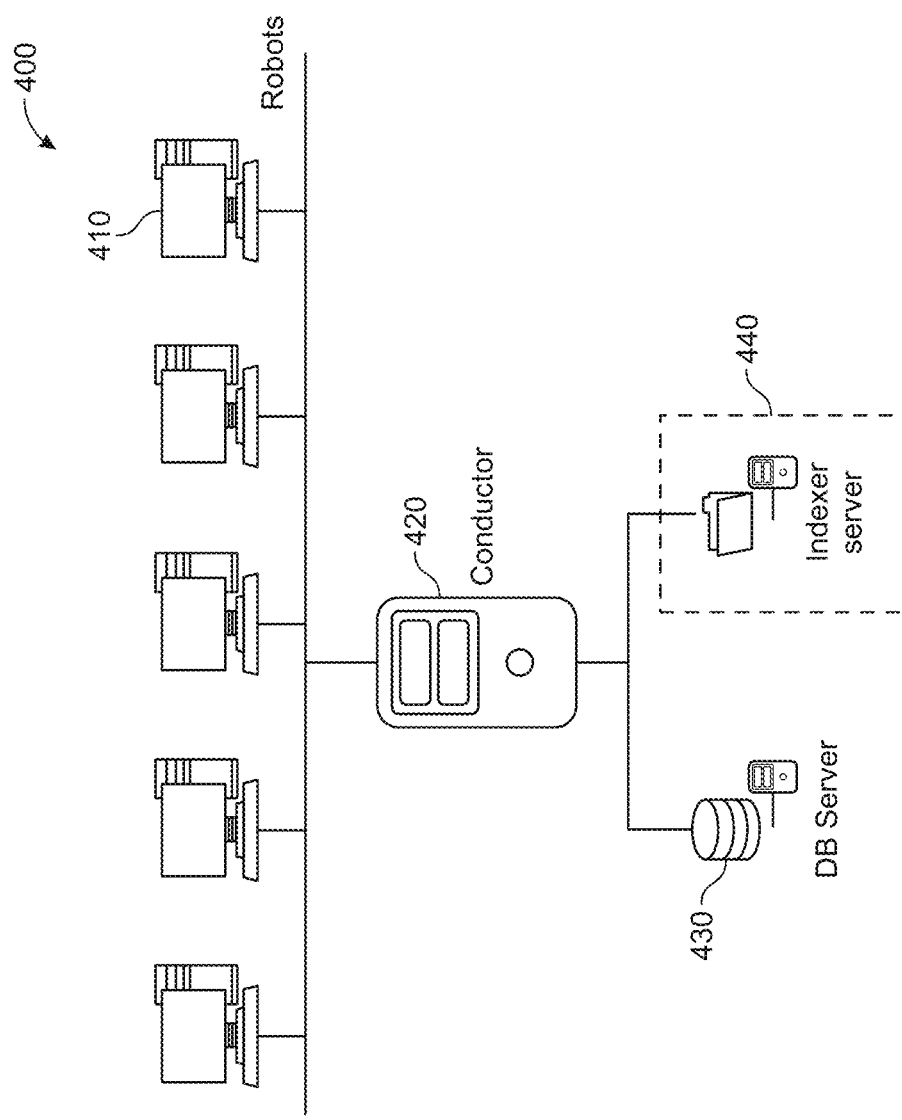
FIG. 4 is an architectural diagram illustrating another RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 (for instance, running robots). In some embodiments, multiple client computing systems 410 are configured to compare the multiple RPA packages and RPA workflows. Multiple client computing systems 410 are further configured to communicate with a conductor computing system 420 via a web application running thereon. Conductor computing system 420, in turn, is configured to communicate with a database server 430 (for instance, the database server 240) and an optional indexer server 440 (for instance, the optional indexer server 250).

With respect to the FIGS. 1 and 3, it should be noted that while the web application is used in these embodiments, any suitable client/server software may be used without deviating from the scope of the invention. For instance, the conductor may run a server-side application that communicates with non-web-based client software applications on the client computing systems. The server may be implemented in localized and distributed forms consistent with computing technology, including cloud computing systems.

Figure 5:
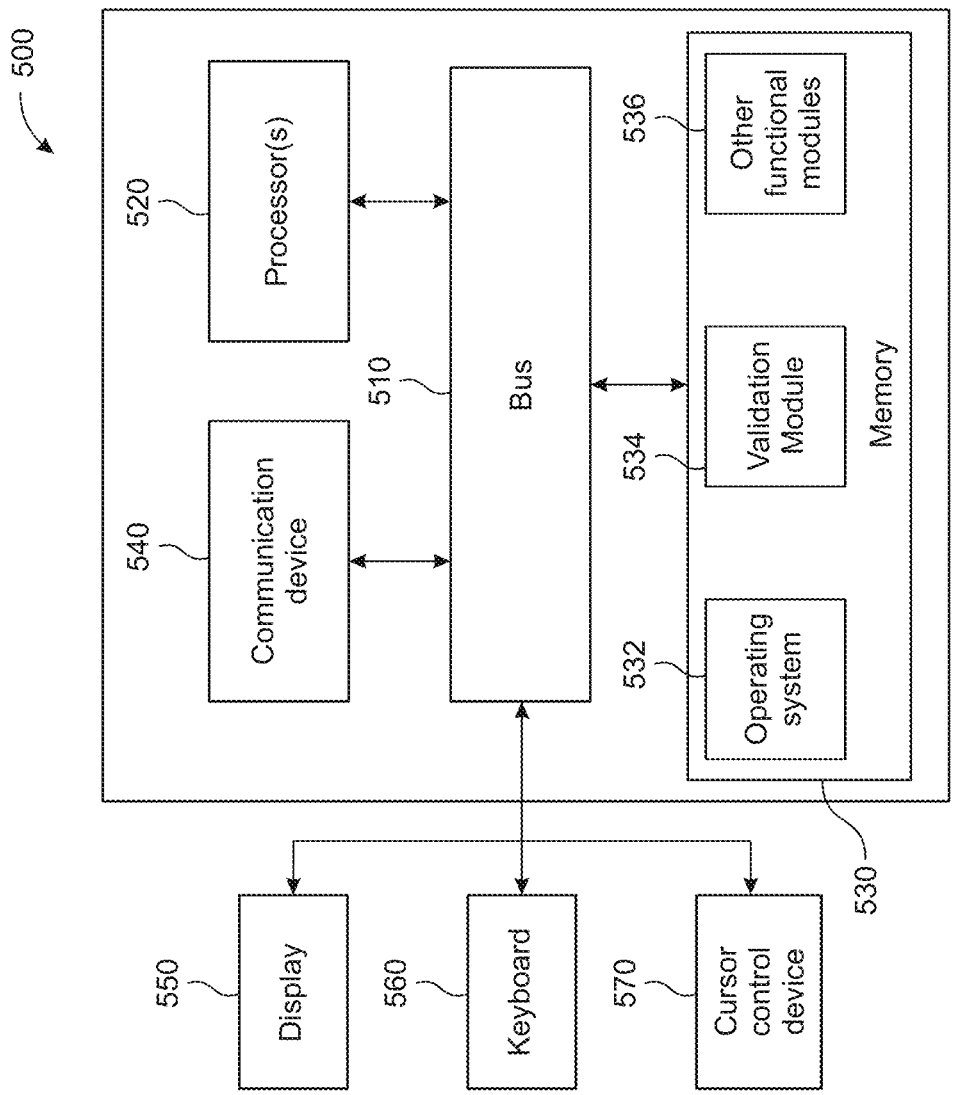
FIG. 5 is an architectural diagram illustrating a computing system configured for validation of labels, according to an embodiment of the present invention.

FIG. 5 is an architectural diagram illustrating a computing system 500 configured to validate label data, according to an embodiment of the present invention. In some embodiments, computing system 500 may be one or more of the computing systems depicted and/or described herein. Computing system 500 includes a bus 510 or other communication mechanism for communicating information, and processor(s) 520 coupled to bus 510 for processing information. Processor(s) 520 could be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 520 may also have multiple processing cores, and at least some of the cores may be configured to perform specific functions. Multi-parallel processing is used in some embodiments. In certain embodiments, at least one of the processor(s) 520 can be a neuromorphic circuit that includes processing elements that mimic biological neurons. In some embodiments, neuromorphic circuits do not require the typical components of a Von Neumann computing architecture.

Computing system 500 further includes a memory 530 for storing information and instructions to be executed by the processor(s) 520. Memory 530 may be comprised of any combination of Random Access Memory (RAM), Read Only Memory (ROM), flash memory, cache, static storage such as a magnetic or optical disk, or any other types of non-transitory computer-readable media or combinations thereof. The non-transitory computer-readable media may be any available media that may be accessed by processor(s) 520 and may include volatile media, non-volatile media, or both. The media may also be removable, non-removable, or both.

Additionally, computing system 500 includes a communication device 540, such as a transceiver, to provide access to a communications network via a wireless and/or wired connection. In some embodiments, communication device 540 is configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, the communication device 540 includes one or more antennas that are singular, arrayed, phased, switched, beamforming, beam steering, a combination thereof, and or any other antenna configuration without deviating from the scope of the invention.

Processor(s) 520 are further coupled via bus 510 to a display 550, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. The display 550 is configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 560 and a cursor control device 570, such as a computer mouse, a touchpad, etc., are further coupled to bus 510 to enable a user to interface with computing system. However, in certain embodiments, a physical keyboard and mouse are not present, and the user interacts with the device solely through display 550 and/or a touchpad (not shown). Any type and combination of input devices may be used as a matter of design choice. In certain embodiments, no physical input device and/or display is present. For instance, the user interacts with computing system 500 remotely via another computing system in communication therewith, or the computing system 500 may operate autonomously.

Memory 530 stores software modules that provide functionality when executed by processor(s) 520. The modules include an operating system 532 for computing system 500. The modules further include a validation module 534 configured to perform all, or part of the processes described herein or derivatives thereof for providing validation of label data and providing the result of validation on a user interface, such as the user interface 310, which includes at least three display panes. Furthermore, validation module 534 includes other components that, when executed, configure the validation module to perform associated functions for validating the label data. These modules may include ML module configured to store a first ML model and a second ML model. These modules may also include a segmentation module configured to segment the label data into one or more parts and segment the ground truth data. In some further embodiments, these modules include a bounding box generation module configured to perform bounding box on label data and ground truth data, an extraction module configured to extract a plurality of attributes from each of the label data and the ground truth data, a comparison module configured to compare plurality of corresponding attributes (such as a first plurality of attributes and a second plurality of attributes) from the label data and the ground truth data and a correction module configured to provide one or more corrective activities for the validated label data. Although these modules are not explicitly shown in the FIG. 5, these modules may be implemented as any combination of one or more modules, either within validation module 534 or separately, without deviating from the scope of the present invention.

One skilled in the art will appreciate that a "system", such as the computing system 500, could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to emphasize their implementation independence more particularly. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code, for instance, includes one or more physical or logical blocks of computer instructions that, for instance, are organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Figure 6B:
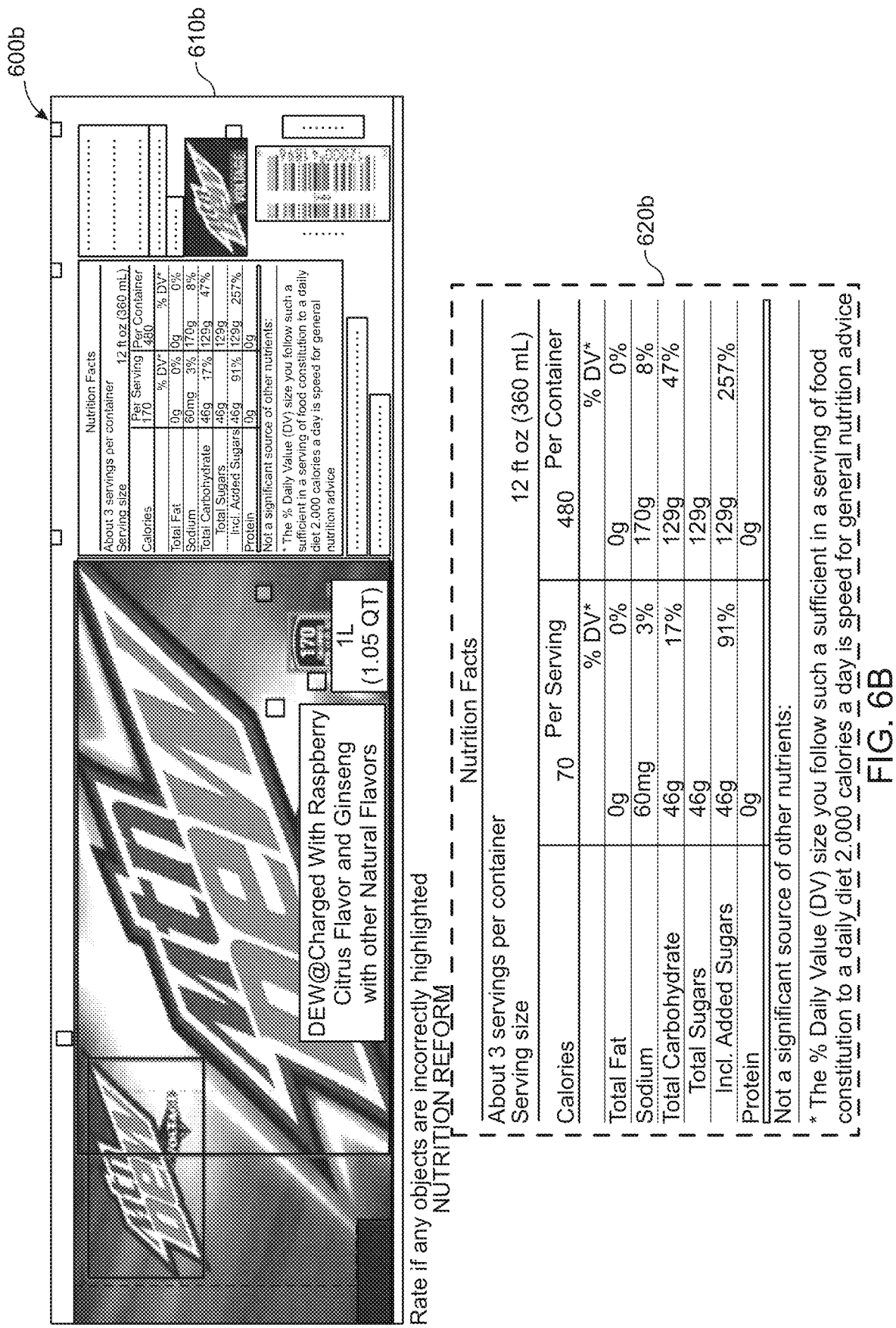

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set or may be distributed over different locations including over different storage devices, and may exist, at least partially, merely as electronic signals on a system or network. FIGS. 6A-6C illustrate exemplary functionalities of user interfaces for label data validation pipeline of actions, according to various embodiments of the present invention.

FIG. 6A is a GUI 600a illustrating a screenshot for label data validation, according to an exemplary embodiment of the present invention. In some embodiments, GUI 600a shows a three pane label validation UI, which includes three display panes: (1) a first display pane 610a, (2) a second display pane 620a, and (3) a third display pane 630a.

First display pane 610a displays one or more mistakes, errors, mismatches, quality parameters and the like, associated with the label data. The mistakes or errors are identified after comparing label data with ground truth data. First display pane 610a also provides visualization of various parameters identified by comparing the label data with the ground truth data. These parameters include such as one or more mistakes, general advisory information for label or artwork designer, OCR advisory information for the label or artwork designer. First display pane 610a further provides a tabular side by side comparison of similar information in label data and ground truth data. There are two tables, an ingredients table, and a nutrition table, showing comparison of similar information fields between ground truth data and label data, with an additional column for Comments. The details of both these tables and their pertinent information will be discussed in conjunction with description of FIG. 6C.

Second display pane 620a displays label data. Label data corresponds to an artwork or a product label designed by a designer or a developer, such as using designer 110 or any other image design application. Second display pane 620a also receives the label data, such as from designer 110 or the other image design application and display the received label data to the user. The label data is displayed with one or more bounding boxes, which may be generated using a first ML model that performs image segmentation for the label data and extracts a first plurality of attributes from the segmented label data to perform the bounding boxes.

Third display pane 630a displays ground truth data. Ground truth data may be in the form of a Label Information Document (LID), which may be received as a template for label from a client company, a design template document for artwork labels that is modified based on type of client company, a scanned product label image, an image of an artwork label selected from stored previously designed label images, a photograph (such as .jpeg or .jpg file) of a product label and the like, by third display pane 630a for displaying to the user. The ground truth data is also displayed with one or more bounding boxes, which are generated using the first ML model, in a manner similar to the steps described above for the label data and discussed further in the following description.

The first ML model is a trained CV based ML model. The ML model is trained on a training dataset of images housing thousands of images of already designed product labels, label template documents, label photographs and the like. The first ML model may classify the received label data from first display pane 610a into one or more predefined categories, which may be identified based on labeling of training dataset done previously. Further, the first ML model may segment the classified label data into one or more parts. The one or more parts may be different regions in the label data, such as different parts of the artwork image, which are then further defined by providing bounding boxes using the first ML model and its associated algorithm. The different parts as identified by the bounding boxes are further associated with a first plurality of attributes of the label data. These first plurality of attributes include text attributes, image attributes or any suitable combination of text attributes and image attributes. For example, in second display pane 620a, the part defined by text Mtn Dew Voltage and its background color and shading effects may form image attributes. In the same label data, the part defined by nutrition facts and its table form text attributes. Each of these parts are defined by different bounding boxes. The bounding boxes representing same attributes in the label data and the ground truth data may be provided in same color for easy identification and comparison. For example, third display pane 630a displays one or more additional bounding boxes provided for a second plurality of attributes of the ground truth data. The second plurality of attributes are also a combination of text attributes and image attributes, just like for the label data. The bounding boxes in second display pane 620a and the additional bounding boxes in third display pane 630a are generated using the first machine model, and as a result, segmented label data and segmented ground truth data are displayed in second display pane 620a and third display pane 630a, respectively.

In some embodiments, the bounding boxes in second display pane 620a and the corresponding additional bounding boxes in third display pane 630a are displayed with same color or pattern.

In some embodiments, the boundaries defined around the different parts in the each of the label data and ground truth data are adjustable and can be varied or set based on user preferences. Further, the boundaries may be self-learned by the first ML model based on adjustment and consequently the first ML model may be self-trained on new or adjusted boundary information. This makes the overall system, such as computing system 500, more efficient, easy to implement for the end user and also up to date with each iteration of label data validation.

Once bounding boxes have been generated for the label data and the ground truth data, the first plurality of attributes and the second plurality of attributes are extracted from the one or more bounding boxes in second display pane 620a and one or more additional bounding boxes from third display pane 630a. Extracting of the first plurality of attributes and second plurality of attributes may be synonymous with extracting of information associated with these attributes.

After extraction, system 500 may perform one or more operations for comparing the first plurality of attributes with the second plurality of attributes using a second ML model. The second ML model may include a trained Named Entity Recognition (NER) model. In some embodiments, the second ML model extracts one or more named entities from a given piece of text, such as from ingredients or nutrition facts tables in label data and ground truth data. For this, the second ML model may use deep learning or neural networks artificial intelligence technologies.

In some embodiments, the second ML model performs data extraction from unstructured documents, such as data obtained from OCR engines, by processing documents like artwork label template documents, in image or PDF formats. For example, the first plurality of attributes and the second plurality of attributes bounded by their corresponding bounding boxes are used for data extraction using the second ML model.

In some embodiments, the first ML model and the second ML model are implemented using an AI fabric processing component, which is either integrated with computing system 500 or is remotely implemented as a cloud component.

Thus, using the ML capabilities of the first ML model and the second ML model, system 500 provides comparison of data in the artwork label and the ground truth label and provide result of comparison on first display pane 610a of UI 600a. Further, the label data of the artwork label is validated based on the displayed result of comparison.

FIG. 6B is a GUI 600b illustrating a screenshot including a second display pane 610b and a third display pane 620b, according to an exemplary embodiment of the present invention. Second display pane 610b and third display pane 620b are analogous in display and functionalities to second display pane 620a and third display pane 630a respectively, shown in conjunction with FIG. 6A.

Second display pane 610b shows segmented label data, which includes the first plurality of attributes bounded by different bounding boxes. For example, the label data in second display pane 610b includes a "Nutrition Facts" table. The ground truth data in third display pane 620b also includes a "Nutrition Facts" table, which is also displayed by a bounding box of same color/pattern as the same table in second display pane 610b. The bounding boxes are generated in both the display panes based on the first learning model.

However, there is a chance of mismatch of the data present in the created artwork label displayed in second display pane 610b and the ground truth data displayed in the third display pane 620b. For example, in FIG. 6B, the created artwork label includes Calories attribute, in the first plurality of attributes, whose displayed value is 170, while in the ground truth data the Calories attribute, from the second plurality of attributes, has a displayed value of 70. This is a mis-match and is identified by the use of second ML model, when a comparison is performed between the two displayed attribute values. In some embodiments, each attribute is identified by an ID information, which is unique for each attribute. This and other such small and big changes are identified by the system 500 and displayed to the user on the user interface 600a using the ML models as disclosed.

Further, in some embodiments, the created bounding boxes around the attributes are highlighted with different colors in the label such that the user can view the corresponding information from the ground truth data below the label. For example, in portion 600b of user interface 600a, the "Nutrition facts" table in the label data in second pane 610b are created using "Nutrition facts" table from ground truth data in third pane 620b. Thus, a bounding box, such as of blue color, may be created for "Nutrition facts" table in the label data and the corresponding "Nutrition facts" table in the ground truth data are also highlighted with the bounding box of the same color (that is, blue color) using the first ML model.

Also, in some embodiments, the user adjusts the bounding boxes and retrain the first ML model if the extracted information by the first ML model is not needed in the label data. Thus, the system stops extracting the information in future labels.

Further, using the second ML model the data from the bounding boxes is extracted in both the label data and ground truth data, and compared for further label data validation.

FIG. 6C is a GUI illustrating a screenshot including a first display pane 600c, according to an exemplary embodiment of the present invention.

First display pane 600c in FIG. 6C is analogous to first display pane 610a in FIG. 6A. First display pane 600c includes display of a summary of results of comparison between the label data and the ground truth data, as effected by the second ML model. The results of comparison include such as a list/table of one or more errors/mistakes in the label data, a list/table of general advisory instructions, a list/table of OCR advisory instructions and the like. Further, first display pane 600c also includes an option to save/respond to the displayed comparison results and take one or more actions for validation of label data. The one or more actions may include at least one of performing a corrective activity for rectifying a mistake in the label data, modifying/editing the label data based on the general or OCR advisory actions, accepting the corrected label data by providing acceptance confirmation response on first display pane 600c or rejecting the corrected label by providing rejection confirmation response on first display pane 600c. For example, first display pane 600c shows a summary list 610c of result of comparison of label data and ground truth data. Summary list 610c shows that there are 5 mistakes, 2 general advisory and 1 OCR advisory that are determined based on the comparison of the label data with the ground truth data (such as comparison of artwork label in second display pane 610b with ground truth data in third display pane 620b). Further, first display pane 600c includes an ingredients table 620c showing a summary of comparison between the ground truth data (LID) in first column and the label data (artwork) in second column, and an additional column for Comments. In the comparison, the mistakes, the general advisory and the OCR advisory may all be shown with different colors and preceded with a "χ" button in each row of the table for easy reference. In ingredients table 620c, there are 4 rows showing mistakes, which are shown with a 'χ' button preceding each mistake. For example, the first row shows a mistake that text content in ground truth data is "HIGH FRUCTOSE SYRUP" but in label data it is "HIGH FRUCTOSECORN SYP ATURA FAO CICACID" which is a mismatch and an error. This mistake may be highlighted in a specific color, such as red color.

Ingredients table 620c also includes a general advisory, for example instead of using an ingredient name "SODIUM CTRATEGUM PACIFIC" in the label data, the term "SODIUM CITRATE" may be used as observed in the ground truth data. It will be understood by one skilled in the art that the ingredients table in label data (as shown in second display pane 620a in FIG. 6A) and ingredients table in ground truth data (as shown in third display pane 630a in FIG. 6A) are for exemplary purpose only, based on one application industry. Similar to these, specific information related to product labels or artwork labels from any other industry, like insurance, retail, and the like, may also be analyzed, without deviating from scope of the present invention.

FIG. 6C also includes a "Nutritiontable" 630c which may be analyzed and information in label data and ground truth data be compared, and summary of comparison be displayed on first display pane 600a in a manner similar to as done for Ingredients table 620c discussed above.

For example, Nutritiontable 630c includes mistakes in label data that include data errors such as 70 in place of 170, general Advisory includes replacing 1 Liter with 1L, and OCR advisory includes confused Zero with the letter "0". These errors may all be highlighted with corresponding colors, such as mistakes with red color, general advisory with orange color, and OCR advisory with blue color.

Also, as previously discussed, the extraction of text and comparison of text between the ground truth data and the label data is done using the second ML model, which is the NER model in this case. The comparison is performed by extracting the first plurality of attributes from the label data and comparing them with the second plurality of attributes from the ground truth data. Both the first plurality of attributes and the second plurality of attributes are a combination of text and image attributes.

Finally, the user can review the mistakes and close the displayed errors by clicking on 'χ' button displayed to the left of the error in each row, to validate the label data. The user may also choose to perform a corrective activity on the label data before validating the label data.

It may be understood by one of ordinary skill in the art that one or more of the GUIs depicted in FIGS. 6A-6C are related to a particular type of product labels and product industry, here beverage industry, only for explaining the embodiments described herein. The systems and methods of these embodiments may also be used in a plurality of other industries such as insurance industry, banking industry, retail industry, manufacturing industry, health and wellness industry, electronics products and mobile device manufacturing units, academic and educational services, and the like, without deviating from the scope of the present invention.

Figure 7:
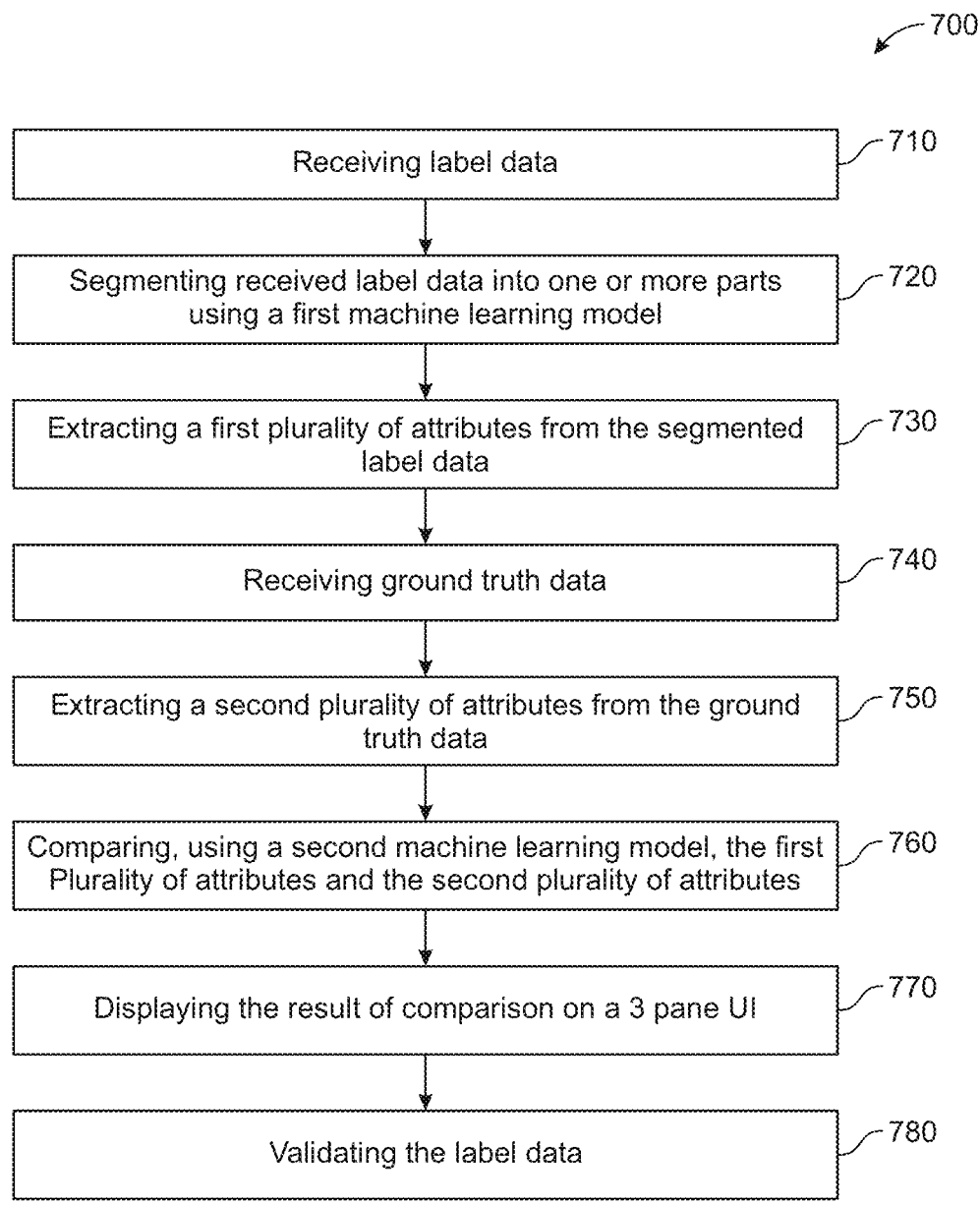
FIG. 7 is a flowchart illustrating a method for validating label data, according to an embodiment of the present invention.

FIG. 7 is a flowchart illustrating a method 700 for label data validation, according to an embodiment of the present invention. In some embodiments, method 700 begins at step 710 with receiving the label data. The label data may be in the form of one or more artwork labels that is designed for a target product based on the LID, which is the ground truth data. The label data may be received by user interface 310 of the system 300 (or analogously system 500) which may be a 3-pane user interface, as depicted in FIGS. 6A-6C. The label data may be received by second display pane 620a of user interface 600a.

Once received, at step 720, the received label data may be segmented into one or more parts using the first ML model. As previously discussed, the first ML model may be a trained CV based ML model. The first ML model may be implemented by validation module 534 of computing system 500. The first ML model may be trained on a training dataset including a plurality of label data images. The first ML model may classify the received label data, such as the artwork label (image), based on the training dataset and then segment the classified label data into one or more parts. Further, the segmented one or more parts of the label data may be associated with one or more bounding boxes (as shown in second display pane 620a) by the first ML model. The size and/or boundary of the bounding boxes may be adjustable and retrainable, based on user input and preference.

Once, the label data has been segmented and provided with bounding boxes around the one or more parts, at step 730, the first plurality of attributes are extracted from the segmented label data. The first plurality of attributes may include a combination of text attributes and image attributes and each bounding box may be associated with at least one type of first plurality of attributes. For example, in FIG. 6A, in second display pane 620a, first plurality attributes include image information for picture of label "MtnDew VOLTAGE" bounded by a bounding box along with its background effects. Similarly, the table of nutrition facts bounded by another bounding box incudes information about calories which is a text attribute.

Similar to label data, method 700 also includes, at step 740, receiving the ground truth data. The ground truth data may be received in third display pane 630a shown in FIG. 6A. Further, the ground truth data may be obtained from a LID, a picture of a previously designed label, a template label document, and the like. The ground truth data may also be subjected to segmentation and generation of one or more additional bounding boxes for the ground truth data, by the first ML model, in a manner similar to as described above for the label data.

At step 750, the second plurality of attributes are extracted from the ground truth data (which are again a combination of text and image attributes). The second plurality of attributes are extracted based on the one or more additional bounding boxes of the ground truth data. For example, the one or more additional bounding boxes are shown in third display pane 630a and are associated with tables such as nutrition facts table and ingredients table in third display pane 630a. Further, as already noted previously, bounding boxes for same type of attributes or data in the label data and the ground truth data are shown by same color.

Method 700 also includes, at step 760, comparing the label data and the ground truth data using the second ML model. The comparison is based on the comparison of the first plurality of attributes and the second plurality of attributes in the label data and the ground truth data, respectively. Further, as already discussed, the second ML model is a trained NER model.

Further, at step 770, displaying the result of comparison, the 3-pane UI 600a (or UI 310). GUI 600a includes the first display pane 610a showing the results of comparison between the label data and the ground truth data. As previously discussed, the results of comparison include one or more of mistakes, errors, general advisory and OCR advisory.

At step 780, the label data is validated. As disclosed previously in conjunction with FIGS. 6A-6C, first display pane 610a displays 'x' button which can be used by the user to provide a user input for performing the corrective activity for the one or more mistakes in the label data. The user may press the 'x' button and close the displayed mistakes or issues by choosing to update the label data. Further, as a result of correction, the user may display on second display pane 620a, the corrected label data that is updated by the user. The user may then again choose to validate the label data by performing all of the steps described on the corrected label data. Finally, the user may choose to accept the corrected label by providing an acceptance confirmation response, such as by saving the corrected label data or closing the label data file to stop any further edits. Alternately, the user may choose to reject the corrected label by providing a rejection confirmation response, such as reverting the changes of the corrected label data or keeping editing the corrected label data in an iterative process.

In an embodiment, method 700 of FIG. 7 includes configuring a computer program associated with a hardware processor configured to execute a series of operations, wherein the series of operations are used to perform all or some of the steps described in conjunction with the method 700. The hardware processor may, for example, be configured to execute the series of operations associated with method 700 by performing hardware implemented logical functions, executing stored instructions, or executing algorithms for performing each of the operations. Alternatively, the apparatus includes a means for performing each of the operations described above. In this regard, according to an embodiment, examples means for executing the series of operations associated with method 700 include processor 520, which is implemented in system 500 and/or a device or circuit for executing instructions or executing an algorithm for processing information as described above.

The computer program may be implemented in hardware, software, or a hybrid implementation. The computer program may be composed of modules that are in operative communication with one another, and which are designed to pass information or instructions to display. The computer program may be configured to operate on a general purpose computer, an ASIC, or any other suitable device.

The methods and systems disclosed herein are configured to provide numerous technical advantages over existing solutions. Some of these technical advantages include such as providing an easy and intuitive user interface for comparing the label data with the ground truth data for validation of label data, such as artwork labels. Further, by providing ease of access in navigating between the label data and the ground truth data, which is achieved by displaying both of these along with results of comparison on a single 3 pane user interface, a lot of time of the user is saved. Further, the use of advanced processing and analytics technologies including but not limited to ML, deep learning, neural networks and the like, the methods and systems are able to provide accurate and automated solutions for user's label design and verification needs. For example, some of the processes discussed herein, like training of ML models, retraining of ML models, performing comparison using ML and the like may be implemented using an automated process of the RPA architecture disclosed in FIG. 2, which may be initiated for an attended robot(s) 132 running in the background, system tray, or the like. An attended robot(s) 132 running in the background may wait for a key press, such as Ctrl+Shift+R, to initiate or trigger a robot(s). The automated process may be any process related to a workflow or workflow activity of the RPA design module 110. Moreover, a validation application or station may provide attended robot 132 users with the capability to perform real time operations such as create, read, update, or delete (CRUD) documents. The capability may be for label data classification, label data extraction, human data validation, or the like in relation to an automation process.

For example, the validation application allows the user to update a prediction superclass (such as beverage, medicine, snack, water, and the like) for the label data, if the first ML model predicated the wrong superclass.

In some embodiments, the validation application provides a capability for the user to correct and adjust the bounding the box in case the prediction and provision of bounding boxes from the first ML model is slightly deviated or wrong. Alternatively, the user can draw a new bounding box in case the ML model fails to recognize the bounding boxes of one or more segments. Moreover, if the user feels the ground truth data (such as the LID) is incorrect with respect to the current artwork label, the user may update the ground truth data with the right one via the validation application and click a button, such as "reprocess" to perform the validation process again, this time with corrected ground truth data. All these functionalities may also be provided by initiating the attended robot(s) 132 for each or some of these tasks according to user preference.

After initiation, the attended robot(s) 132 may provide train or execute phases of a deep learning, deep learning neural network, TensorFlow® deep learning, TensorFlow® framework model, or the like for label data validation. TensorFlow may be configured or utilized via a library of a programming language. For instance, TensorFlow® may be a library found in the Python programming language. The train or execute phases may provide an additional or extra security layer by performing label data validation. It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifi-

The invention claimed is:

1. A computer-implemented method for validating label data, the method comprising:
  segmenting, using a first machine learning model, a received label data into one or more parts to provide segmented label data;
  extracting a first plurality of attributes from the segmented label data;
  receiving ground truth data associated with the label data;
  extracting a second plurality of attributes from the received ground truth data;
  comparing, using a second machine learning model, the first plurality of attributes associated with the segmented label data with the second plurality of attributes associated with the ground truth data;
  displaying, on a user interface (UI) comprising at least three display panes, the result of comparison; and
  validating the label data based on the displayed result of comparison.

2. The computer-implemented method of claim 1, wherein the label data comprises image data associated with at least one artwork label.

3. The computer-implemented method of claim 1, wherein the at least three display panes comprise:
  a first display pane displaying one or more mistakes in the label data that are identified in the result of comparison;
  a second display pane displaying the label data; and
  a third display pane displaying the ground truth data.

4. The computer-implemented method of claim 3, further comprising:
  receiving, within the first display pane, a user input for performing a corrective activity for the one or more mistakes in the label data;
  updating, within the first display pane, the label data based on the received user input;
  displaying, on the second display pane, corrected label data based on the update; and
  validating the corrected label data, wherein
  the validating of the corrected label data comprises accepting the corrected label data by providing acceptance confirmation response or rejecting the corrected label by providing rejection confirmation response.

5. The method of claim 1, wherein segmenting, using the first machine learning model, the received label data into one or more parts further comprises:
  classifying, using the first machine learning model, the received label data, wherein the first machine learning model is a trained computer vision (CV) based machine learning model; and
  segmenting the classified label data into the one or more parts.

6. The computer-implemented method of claim 5, further comprising:
  generating one or more bounding boxes for each of the one or more parts of the segmented label data based on the classification;
  associating the one or more bounding boxes with the first plurality of attributes, wherein the first plurality of attributes comprises text attributes, image attributes, or a combination thereof; and
  displaying the generated one or more bounding boxes in the second display pane.

7. The computer-implemented method of claim 6, further comprising adjusting a boundary of the one or more generated bounding boxes.

8. The computer-implemented method of claim 6, further comprising:
  generating one or more additional bounding boxes for the ground truth data;
  associating the one or more additional bounding boxes with the second plurality of attributes, wherein the second plurality of attributes comprise text attributes, image attributes, or a combination thereof; and
  displaying the generated one or more additional bounding boxes in the third display pane, wherein the one or more additional bounding boxes in the third display pane and the one or more bounding boxes in the second display pane are displayed in one or more of same display color or same display pattern.

9. The computer-implemented method of claim 8, further comprising:
  extracting the first plurality of attributes from the one or more bounding boxes of the segmented label data;
  extracting the second plurality of attributes from the one or more additional bounding boxes of the ground truth data; and
  comparing, using the second machine learning model, the first plurality of attributes from the segmented label data with the second plurality of attributes from the ground truth data, wherein the second machine learning model comprises a trained Named Entity Recognition (NER) model.

10. A system to validate label data, the system comprising:
  memory configured to store one or more computer-executable instructions; and
  one or more processors configured to execute the one or more instructions to:
    segment, using a first machine learning model, a received label data into one or more parts to provide segmented label data;
    extract a first plurality of attributes from the segmented label data;
    receive ground truth data associated with the label data;
    extract a second plurality of attributes from the received ground truth data;
    compare, using a second machine learning model, the first plurality of attributes associated with the segmented label data with the second plurality of attributes associated with the ground truth data;
    display, on a user interface (UI) comprising at least three display panes, the result of comparison; and
    validate the label data based on the displayed result of comparison.

11. The system of claim 10, wherein the label data comprises image data associated with at least one artwork label.

12. The system of claim 10, wherein the at least three display panes of the UI comprise:
  a first display pane displaying one or more mistakes in the label data that are identified in the result of comparison;
  a second display pane displaying the label data; and
  a third display pane displaying the ground truth data.

13. The system of claim 12, wherein the one or more processors are further configured to execute the one or more instructions to:
  receive a user input for performing a corrective activity for the one or more mistakes in the label data;
  update the label data based on the received user input;

display, on the second display pane, corrected label data based on the update; and validate the corrected label data, wherein validating comprises at least one of accepting the corrected label data by providing acceptance confirmation response or rejecting the corrected label by providing rejection confirmation response.

14. The system of claim 10, wherein to segment, using the first machine learning model, the received label data into one or more parts, the one or more processors are further configured to execute the one or more instructions to:

classify, using the first machine learning model, the received label data, wherein the first machine learning model is a trained computer vision (CV) based machine learning model; and segment the classified label data into the one or more parts.

15. The system of claim 14, wherein the one or more processors are further configured to execute the one or more instructions to:

generate one or more bounding boxes for each of the one or more parts of the segmented label data based on the classification;

associate the one or more bounding boxes with the first plurality of attributes, wherein the first plurality of attributes comprises text attributes, image attributes, or a combination thereof; and display the generated one or more bounding boxes in the second display pane.

16. The system of claim 15, wherein the one or more processors are further configured to adjust a boundary of the one or more generated bounding boxes.

17. The system of claim 15, wherein the one or more processors are further configured to execute the one or more instructions to:

generate one or more additional bounding boxes for the ground truth data;

associate the one or more additional bounding boxes with the second plurality of attributes, wherein the second plurality of attributes comprise text attributes, image attributes, or a combination thereof; and display the generated one or more additional bounding boxes in the third display pane, wherein the one or more additional bounding boxes in the third display pane and the one or more bounding boxes in the second display pane are displayed in one or more of same display color or same display pattern.

18. The system of claim 17, wherein the one or more processors are further configured to execute the one or more instructions to:

extract the first plurality of attributes from the one or more bounding boxes of the segmented label data;

extract the second plurality of attributes from the one or more additional bounding boxes of the ground truth data; and compare, using the second machine learning model, the first plurality of attributes from the segmented label data with the second plurality of attributes from the ground truth data, wherein the second machine learning model comprises a trained Named Entity Recognition (NER) model.

19. A computer program embodied on a non-transitory computer readable medium, the computer program is configured to cause one or more processors to:

segment, using a first machine learning model, a received label data into one or more parts to provide segmented label data;

extract a first plurality of attributes from the segmented label data;

receive ground truth data associated with the label data;

extract a second plurality of attributes from the received ground truth data;

compare, using a second machine learning model, the first plurality of attributes associated with the segmented label data with the second plurality of attributes associated with the ground truth data;

display, on a user interface (UI) comprising at least three display panes, the result of comparison; and validate the label data based on the displayed result of comparison.

20. The computer program of claim 19, wherein the at least three display panes comprise:

a first display pane displaying one or more mistakes in the label data that are identified in the result of comparison;

a second display pane displaying the label data; and a third display pane displaying the ground truth data.

* * * * *